(12) United States Patent
Hepfinger et al.

(10) Patent No.: US 6,528,437 B1
(45) Date of Patent: Mar. 4, 2003

(54) COMPOSITE FABRIC FOR VEHICLES

(75) Inventors: John M. Hepfinger, Greenville, SC (US); Earle Wolynes, Spartanburg, SC (US); Keith M. Blackwell, Duncan, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 09/447,707

(22) Filed: Nov. 23, 1999

(51) Int. Cl.[7] ................... B32B 27/12; B32B 27/40; B32B 5/18; B32B 5/26

(52) U.S. Cl. ................ 442/38; 442/30; 442/35; 442/43; 442/45; 442/46; 442/49; 442/56; 442/57; 442/315; 442/319

(58) Field of Search ............... 442/1, 30, 35, 442/38, 43, 45, 46, 49, 56, 57, 136, 141, 144, 145, 146, 315, 319

(56) References Cited

U.S. PATENT DOCUMENTS

| 3,822,762 | A | * | 7/1974 | Crispin et al. | 181/33 |
|---|---|---|---|---|---|
| 4,263,356 | A | | 4/1981 | Nomura et al. | 428/138 |
| 4,432,580 | A | | 2/1984 | Lohmar et al. | 296/39 A |
| 4,652,485 | A | * | 3/1987 | Fesman | 428/290 |
| 5,166,480 | A | | 11/1992 | Böttger et al. | 181/292 |
| 5,509,247 | A | | 4/1996 | Fortez et al. | 52/630 |
| 5,554,830 | A | | 9/1996 | Müller et al. | 181/290 |
| 5,718,791 | A | * | 2/1998 | Spengler | 156/212 |
| 5,824,973 | A | | 10/1998 | Haines et al. | 181/286 |
| 5,945,359 | A | * | 8/1999 | Graham | 442/314 |
| 6,120,630 | A | * | 9/2000 | Lorbiecki | 156/79 |
| 6,245,695 | B1 | * | 6/2001 | Maruo et al. | 442/136 |
| 6,305,494 | B1 | | 10/2001 | Pfaffelhuber et al. | 181/286 |
| 6,305,495 | B1 | | 10/2001 | Keegan | 181/290 |

* cited by examiner

*Primary Examiner*—Cheryl A. Juska
*Assistant Examiner*—Ula C. Ruddock
(74) *Attorney, Agent, or Firm*—Terry T. Moyer; Charlotte C. Wilson

(57) ABSTRACT

The present invention is a durable composite consisting of a polyester knitted fabric and an extruded film that are heat laminated together without the use of additional adhesive. The open-mesh structure of the fabric, when combined with the film, results in improved sound dissipation for the composite as compared with conventional textile headliners. Because both the fabric and the film components have flame retardant constituents, the resulting composite is capable of meeting even the most stringent of flammability requirements. An optional backing layer may be added to the film layer to create a three-layer composite, which may be suited for certain applications.

4 Claims, 2 Drawing Sheets

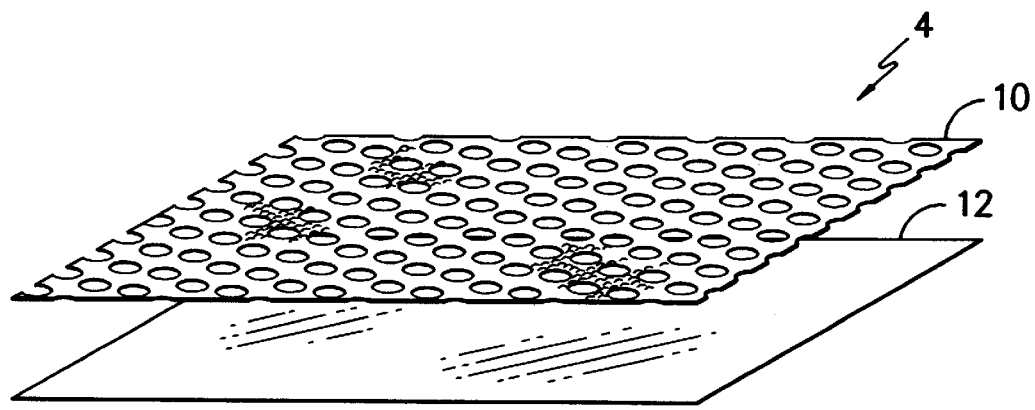
FIG. -1-
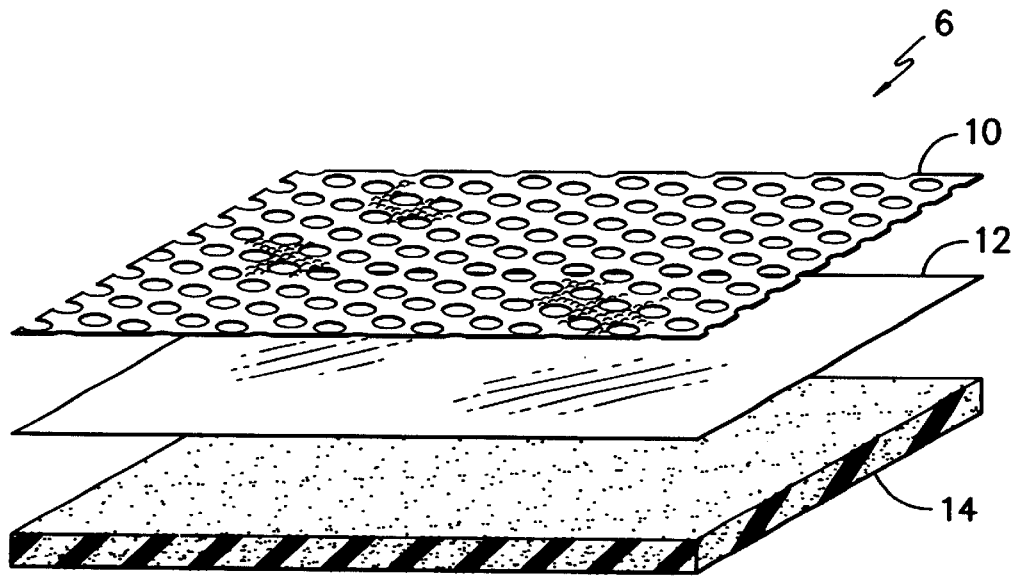
FIG. -2-

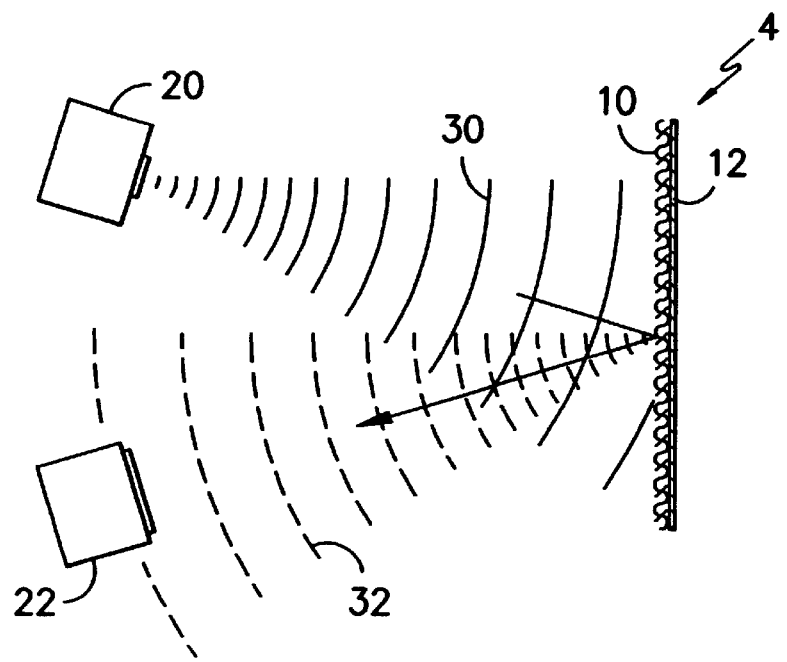
FIG. -3-
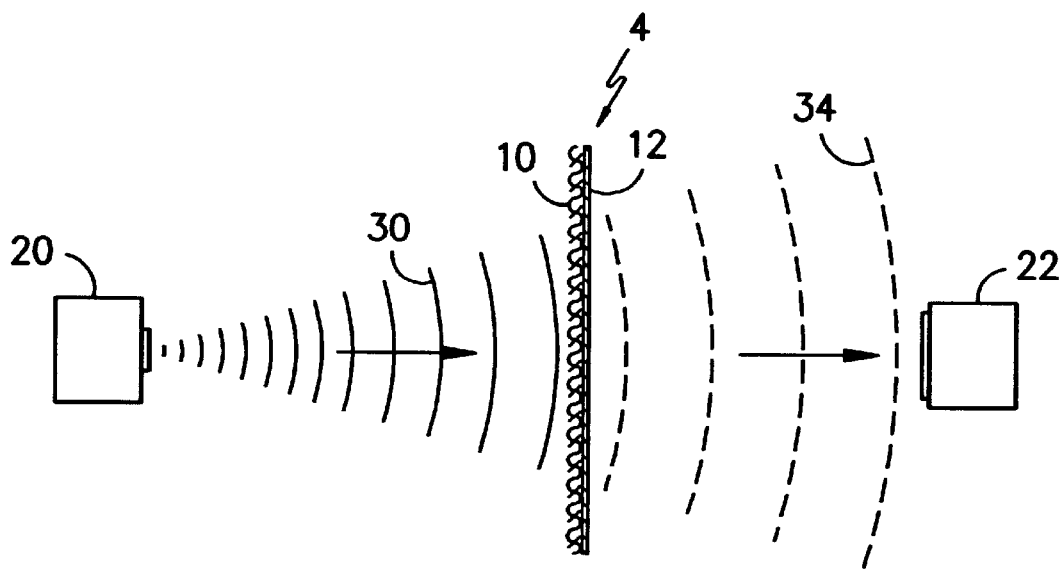
FIG. -4-

COMPOSITE FABRIC FOR VEHICLES

TECHNICAL FIELD

This invention relates generally to composite fabrics having unique aesthetic and physical characteristics. Specifically, the present invention relates to a textile composite that is comprised of a warp knitted, flame-resistant fabric and a flame-resistant extruded film, the two layers being heat laminated without the addition of any adhesives. The composite exhibits the characteristics of flame resistance and sound dissipation, making it particularly well-suited for application in a wide variety of vehicles, and especially well-suited for use as a vehicle headliner fabric.

DESCRIPTION OF THE PRIOR ART

In the manufacture of transportation vehicles, it is common practice to line the interior roof, as well as the interior sides and doors of the vehicle, with a suitable, aesthetically pleasing fabric. Ideally, such a fabric has the ability to dampen, or dissipate, sound, whether such sound is external to the vehicle (such as from traffic noises) or generated from within the vehicle (such as from engine noise).

As used herein, the word "dissipate" means to scatter, break up, or disperse. In relation to sound waves, dissipation refers to the act of deflecting sound waves in such a way as to minimize the sound. Dissipation can be achieved by reflecting the sound waves away from a surface or by allowing the sound waves to be transmitted through a surface, such as through the roof of a vehicle. In particularly noisy vehicles, such as large automobiles, trucks, buses, planes, trains, and the like, the dissipation of sound is particularly important to the comfort and well-being of the passengers.

Various materials and combinations have been utilized for the purpose of sound dissipation. Historically, a composite consisting of vinyl-coated foam was often used. This conventional vinyl-coated foam has several deficiencies, which include cost, limited design potential, poor sound absorption, and an inability to meet flammability testing requirements for use across a wide range of vehicles. As a result, it has become more common to use a textile material (such as a warp-knitted tricot fabric, for example) that is laminated to a foam base. Such textile-foam composites have improved design capabilities, but have limited durability due to the foam's tendency to degrade. In addition, these composites do not address the flammability concerns of vehicle manufacturers.

It has been found that, in conventional headliner systems, the headliner fabric tends to separate from the foam either because the foam tends to degrade over time or because the adhesive between the foam and fabric tends to fail. This separation makes the fabric sag and droop, thus resulting in a condition that is both irritating and aesthetically displeasing to the vehicle occupants. An improved adherence between the headliner and the foam backing would represent a useful advancement over conventional headliner systems. Even more useful would be a liner that eliminates the foam component of the conventional headliner system, but that maintains a high degree of sound dissipation. The development of a sound-dissipating fabric for use in vehicles, which does not require the use of foam components, represents a useful advancement over conventional composites. The present invention represents such an advancement.

Textile composites are well known in the industry, as a means of adding strength or rigidity to a textile. In other applications, composite structures are comprised of aesthetically pleasing layers, which enhance the appearance of the final composite. The present invention embodies aesthetically pleasing layers that exhibit three sets of desirable characteristics; that is, the composite of the present invention is durable, is flame-resistant, and is capable of sound dissipation.

SUMMARY

The present invention is a durable composite consisting of a polyester knitted fabric and an extruded film that are heat laminated together without the use of additional adhesive. The open-mesh structure of the fabric, when combined with the film, results in improved sound dissipation for the composite as compared with conventional textile headliners. Because both the fabric and the film components have flame retardant constituents, the resulting composite is capable of meeting even the most stringent of flammability requirements. An optional backing layer (made of foam or a suitable non-woven structure) may be added to the film layer to create a three-layer composite, which may be suitable for some applications.

Prior to inclusion in the composite, the knitted, open-mesh fabric can be dyed in a variety of colors to suit the tastes of vehicle manufacturers and their customers. Likewise, the extruded film that is laminated to the fabric is also available in many colors. The combinations of fabric color and film color lead to a variety of aesthetically pleasing composites. The color of the optional backing layer is not important, as that layer will not be visible to the vehicle occupants.

More important than appearance, however, is the requirement that, in the United States and in many other countries, any fabrics used in vehicles meet certain specific flammability standards. These standards are designed to protect vehicle occupants who may be involved in accidents, but these standards also disqualify many of the fabrics and fabric composites that might otherwise be used for their aesthetic appearance. The flammability tests required in the United States and Europe will be discussed herein.

The term "flame resistant" describes a material that burns slowly or is self-extinguishing after removal of an external source of ignition. A fabric can be flame resistant because of the innate properties of the fibers, the twist level of the yarn, the fabric construction, or, as in the case of the present invention, the presence of a flame retardant. The term "flame retardant" describes a class of chemicals which, when applied to a textile substrate during processing, help to reduce its flammability. A textile that has been treated with flame-retardant chemistry can be said to be "flame retarded" or "flame resistant."

By producing a durable composite that meets these flammability standards and is also capable of dissipating sounds associated with vehicle travel, the present invention provides a useful advancement over the prior art.

BRIEF DESCRIPTION OF THE DRAWINGS

FIG. 1 is an expanded view of the fabric composite of the present invention.

FIG. 2 is an expanded view of the fabric composite of FIG. 1, but which includes an added backing layer.

FIG. 3 is a schematic diagram of a reflectance experiment, showing the reflectance of sound waves from the fabric composite of FIG. 1.

FIG. 4 is a schematic diagram of a transmission experiment, showing the transmission of sound waves through the fabric composite of FIG. 1.

DESCRIPTION OF THE PREFERRED EMBODIMENTS

The present invention is a textile composite 4 in which one layer of the composite is an open mesh fabric 10 and a second layer of the composite is a flexible film 12, such as of urethane or the like. The two layers are heat-laminated to one another without the use of an adhesive layer or any adhesive medium therebetween. Composite 4, in addition to being durable, has the ability to resist flame spread and to dissipate sound. In certain applications, it may be desirable to include a backing layer 14, comprised of either foam or a non-woven material.

In a preferred embodiment shown in FIG. 1, composite 4 contains a knitted, polyester fabric 10 and an extruded film 12, fabric 10 having an open mesh configuration and film 12 having incorporated flame retardant constituents. In an alternate embodiment shown in FIG. 2, backing layer 14 is attached to film 12 to form three-layer composite 6.

Fabric 10 is a polyester warp knit fabric produced on a conventional warp knit machine. A set of yarns is warp-knitted as a fabric substrate, using at least a two-bar construction and preferably, a three-bar raschel knit construction. Fabric 10, which is the product of the three-bar construction, has an open mesh appearance. The size of the holes in the mesh structure should not exceed 0.2 inches in diameter, because larger holes adversely affect the dissipation of sound waves 30. In a preferred embodiment, fabric 10 has at least nine holes per square inch.

Fabric 10 has a surface that is raised on one side above the plane of fabric 10. The technical back of fabric 10 is raised more than the technical front of fabric 10, because of the knit configuration used, and, therefore, the technical front of fabric 10 is laminated to film 12 to achieve greater sound dissipation. The raised surface of fabric 10 aids in scattering sound waves 30 that are directed at the fabric portion of composite 4, when composite 4 is positioned in a vehicle. The technical back of fabric 10 forms the effective face of composite 4, when viewed from the fabric side, and parts of film 12 are seen through the mesh construction of fabric 10.

Fabric 10 is comprised of moderate denier yarns necessary to create the aforementioned raised surface and to stabilize fabric 10. The yarns should be of at least 70 denier to create a finished thickness of 30 mils, the minimum thickness for effectively dissipating sound. It has been found that 1/150/34 warp-drawn polyester yarns are particularly well-suited for this application, although it is anticipated that other yarns may be used as long as the chosen yarns produce the desired fabric thickness.

Once knitted, fabric 10 is then dyed in a conventional dye jet with a bromine-based flame retardant added in the dye bath. After dyeing, fabric 10 is then finished with a phosphorous-based flame retardant. Alternatively, the yarns of fabric 10 could be package-dyed prior to knitting, as long as the flame retardant was incorporated into the dye bath. In the case of package-dyed yarns, a second flame retardant is applied after fabric 10 is knitted. It is believed that the two flame retardants act synergistically to enhance the effectiveness of the flame resistance in composite 4. This synergy increases the capacity of composite 4 to deter flame spread. It has been found that this synergistic effect is realized only in polyester fabrics, thus making polyester the preferred material for composite 4 or composite 6 of the present invention.

Fabric 10 is then heat-laminated with urethane-based film 12. Film 12 is comprised of a flame resistant compound such as polyester urethane or the like. Such film 12 is commercially available from Deerfield Urethanes, Inc. of South Deerfield, Mass. Film 12 should be at least 1 mil (+e,fra 1000+ee$^{th}$ of an inch) in thickness to create a protective barrier on the back of fabric 10. Film 12 should not exceed 10 mils in thickness as a greater thickness increases the likelihood of flame spread. Film 12 also provides a continuous surface for adhesion to the vehicle interior. Because of the uniform nature of film 12, composite 4 can be adhered to a vehicle panel without interference and with assurance that a strong seal can be maintained. Any liquid adhesive known to those of skill in the art is suitable for such application.

In the United States, the standard for flammability is Motor Vehicle Safety Standard 302, as described in 40 CFR 571.302. Motor Vehicle Safety Standard 302 measures the burn rate of the fabric by exposing the fabric to an open flame. The European flammability test, Directive 95/28/EG Annex IV, determines the suitability of particular fabrics for use in public transportation (such as buses). The European test is even more stringent than Motor Vehicle Safety Standard 302. In the European test, the fabric is positioned twelve inches above a pile of cotton fibers. The fabric is ignited and allowed to burn, as testers monitor the burn rate and the melting fibers that fall from the fabric. These melting fibers must extinguish themselves before they fall onto, and ignite, the pile of cotton fibers. If the melting fibers ignite the cotton fibers, then the fabric does not pass the test or meet the standard. Composite 4 is capable of meeting the standards of both the European and U.S. flammability requirements.

To test the sound dissipative qualities of composite 4, a set of experiments was devised. The arrangement of equipment in these experiments is shown in FIGS. 3 and 4. Three types of materials were used in each test: a film (such as 12, which might be included in composite 4); a brushed, warp-knit, tricot fabric (as might be used in a conventional headliner); and the textile composite of the present invention (indicated at 4). For the purposes of illustration, only composite 4 has been shown in the Figures to indicate the position of the respective materials during the tests.

A first experiment, as shown in FIG. 3, was conducted using an impedance tube to measure the reflectance of sound as sound waves encountered, at a certain distance, one of the materials (whose position is represented by composite 4). A signal 30 originated at a source 20, and reflected sound waves 32 were measured by a measurement device 22 adjacent to source 20. In this experiment, film 12 showed the highest level of reflectance, followed by composite 4 and the conventional headliner.

A second experiment, as illustrated in FIG. 4, tested the transmission of sound through one of the materials (as represented by composite 4), by moving measurement device 22 to a position directly opposite source 20. Sound waves 30 originated from source 20, and transmitted sound waves 34 were detected by measurement device 22. In this experiment, the conventional headliner showed the highest level of transmission, indicating the highest number of transmitted sound waves 34. Film 12 showed very low transmission, indicating a low number of transmitted sound waves 34. Composite 4 showed less transmitted sound waves 34 than the conventional headliner material.

It is believed, in order to effectively dissipate sounds associated with vehicle travel, that a headliner must be able to both reflect and transmit sounds. The combination of reflectance and transmission reduces these sounds and provides for a quieter environment for the vehicle's occupants.

Clearly, because composite 4 of the present invention is able to both reflect and transmit sound waves, it is an ideal choice for applications in which sound dissipation is important.

An alternate embodiment, as illustrated in FIG. 2, includes backing layer 16 that is secured to film 12 to produce three-layer composite 6. Backing layer 16 is comprised of either any approved headliner foam as is conventionally known and accepted or a suitable non-woven structure. An example of such a foam as would be used in backing layer 16 is a polyether foam available from Foamex International of East Providence, R.I. or Vita Olympic of Greensboro, N.C. A generally accepted thickness of foam for backing layer 16 is 3 millimeters. It has been found that this thickness is suitable for inclusion into composite 6, although it is contemplated that other thicknesses may also be used. When backing layer 16 is comprised of foam, backing layer 16 is flame-laminated onto the film portion 12 of composite 4, without the use of adhesive. The omission of adhesive in the generation of composite 4 and composite 6 is important because of a tendency for known adhesives to burn, a condition that leads to failure during flammability testing.

Alternatively, a non-woven structure could be used as backing layer 16. Specifically, a structure comprised of either fiberglass batting or a treated polyester mat could be used. Fiberglass batting is the preferred non-woven component, because of the flame resistant nature of that material. However, a non-woven polyester mat that has been treated with flame retardant chemicals may also be used. Adhesive lamination is used to affix the non-woven embodiment of backing layer 16 to composite 4.

While backing layer 16 tends to improve sound concerns because of the tendency of backing layer 16 to absorb sound, there is a general decrease in the level of flame resistance exhibited by three layer composite 6. The flame resistance of composite 6 is sufficient to pass the Motor Vehicle Safety Standard in the United States, but may be insufficient to pass the European test for use in public transportation (such as buses). As would be expected, composite 6 is more expensive to produce than composite 4, due to the cost associated with the purchase of backing layer 16 and the additional production steps. For those reasons, it is anticipated that the addition of backing layer 16 would be most desirable in personal transportation vehicles, where concerns about the comfort of the passengers are more pressing.

The knit structure of fabric 10 may be altered to any open mesh configuration provided that the thickness of fabric 10 is not less than 30 mils, and the mesh has at least nine holes per square inch. Yarns and knit construction can be varied along with fiber type and film type, as long as resulting composite 4 is capable of meeting vehicle flammability requirements.

The durability and strength of composite 4, when compared with conventional woven headliners, is shown in the following Example and Table. A Results Summary is also included.

EXAMPLE 1

The composite, having a weight of 289 g/m$^2$ and a thickness of 1.25 millimeters (49 mils), was comprised of a 100% polyester raschel warp-knit fabric and a polyurethane film. The yarns comprising the open-mesh fabric were 150 denier yarns. The fabric was knitted and then treated during dyeing with bromine-based flame retardant Antiblaze NT as provided by Albright and Wilson. The fabric was then finished with a second treatment with phosphorous-based flame retardant, FRAC, a proprietary chemical solution provided by Milliken Chemical Division of Milliken & Company. The fabric was then heat-laminated to a polyester urethane film. The film that was used was a urethane film, treated with flame retardant chemicals, provided by Deerfield Urethanes, Inc. and having a thickness of 3 mils.

Strength testing of the composite, as compared with a conventional knit headliner, was conducted, according to ASTM test methods. The conventional headliner was a circular knit fabric that was finished without the addition of flame retardants. The circular knit had a thickness of 1.2 millimeters (47 mils) and was comprised of 150 denier polyester yarns. The particular headliner fabric was yarn-dyed, but could also have been jet-dyed.

The grab tensile test, in accordance with ASTM Test Method D5034, is designed to measure the breaking strength of a fabric sample at its breaking load (measured in pounds).

The trap tear test, in accordance with ASTM Test Method D5587, is designed to measure the force required to begin or continue to tear a fabric under certain conditions.

The elongation % at peak load, in accordance with ASTM Test Method D5034, is designed to measure the elongation of a fabric as a percentage of its original length at the peak load.

The composite and the conventional headliner underwent the above tests, the results of which are summarized in Table 1 below.

TABLE 1

| TEST | CONVENTIONAL HEADLINER FABRIC | COMPOSITE FABRIC |
| --- | --- | --- |
| Grab Tensile | | |
| Warp direction | 106 lbs. | 201.2 ± 4.76 lbs. |
| Fill direction | 90.8 lbs. | 209.3 ± 1.77 lbs. |
| Trap Tear | | |
| Warp direction | 20.4 lbs. | 42.1 ± 2.8 lbs. |
| Fill direction | 25.2 lbs. | 38.5 ± 1.9 lbs. |
| Elongation % at Peak Load | | |
| Warp direction | 71.2% | 64.3% |
| Fill direction | 102.7% | 56.1% |

Results Summary

The composite fabric showed significantly more tensile strength than the conventional headliner fabric did, in both the warp and the fill directions. The composite fabric showed less elongation % than the conventional headliner fabric did, in both the warp and the fill directions.

EXAMPLE 2

The sound dissipative capability of composite fabric was tested in comparison with a conventional headliner fabric. The composite fabric was that of Example 1. The conventional headliner fabric was also that of Example 1, a circular knit fabric.

The reflectance test was conducted using an impedance tube system to measure the reflectance of sound as sound waves encountered, at a certain distance, each of the materials. A series of fourteen signals, having a frequency of between 200 Hz and 2015 Hz, originated individually from a source located 6 inches from the material. The reflected sound waves were measured by a microphone located adjacent to the source.

The transmission test was conducted using an impedance tube system to measure the transmission of sound as-sound waves encountered, and passed through, each of the materials. A series of fourteen signals, having a frequency of between 200 Hz and 2015 Hz, originated individually from a source located 6 inches from the material. The transmitted sound waves were measured by a measurement source located directly across the source, 6 inches from the material.

In each test, the impedance tube system calculated an absorption coefficient for each frequency.

Results Summary

In general, when plotted on a scatter graph, the points associated with the composite fabric exhibited higher values for absorption coefficient than the points associated with the conventional headliner. At over 70% of the tested frequencies, the composite fabric showed a higher absorption coefficient than the conventional headliner fabric.

We claim:

1. A composite fabric, suitable for use in a variety of vehicles and that transmits and reflects sound waves, said composite fabric comprising a first layer, a second layer, and a third layer, wherein said first layer is comprised of an open-mesh, knitted fabric having a front side and a rear side, said knitted fabric being comprised of at least 70 denier polyester yarns, and wherein said second layer is comprised of a flame resistant, polyurethane film having a thickness of between 1 thousandth of an inch and 10 thousandths of an inch, said second layer being attached without adhesive to said front side of said knitted fabric, and wherein said third layer is affixed to said second layer and is comprised of a backing substrate selected from the group consisting of polyether foam, fiberglass batting, or non-woven polyester mat.

2. The composite of claim 1, wherein said backing substrate is polyether foam that is flame laminated onto said second layer.

3. The composite of claim 1, wherein said backing substrate is either fiberglass batting or non-woven polyester mat that is adhesive laminated onto said second layer.

4. The composite fabric of claim 1, wherein said composite fabric has a composite face side and a composite rear side, said composite face side being formed from said rear side of said knitted fabric and said composite rear side being formed from said backing substrate.

* * * * *